United States Patent [19]

McCullough

[11] Patent Number: 5,669,942
[45] Date of Patent: Sep. 23, 1997

[54] ABRASIVE SANDING PASTE

[76] Inventor: David Keith McCullough, 908 Margaret Ave., Coeur d' Alene, Id. 83814

[21] Appl. No.: 213,545

[22] Filed: Mar. 16, 1994

[51] Int. Cl.$^6$ ........................................... B24D 3/34
[52] U.S. Cl. .................... 51/307; 51/308; 106/3
[58] Field of Search .................. 51/307, 308; 106/3; 252/174.25, DIG. 14

[56] References Cited

U.S. PATENT DOCUMENTS

| | | | |
|---|---|---|---|
| 3,089,764 | 5/1963 | Smith-Gorman | 51/308 |
| 3,966,432 | 6/1976 | Rayner | 51/308 |
| 4,005,027 | 1/1977 | Hartman | 252/95 |
| 4,133,779 | 1/1979 | Hellyer et al. | 252/547 |
| 4,240,919 | 12/1980 | Chapman | 252/95 |
| 4,314,990 | 2/1982 | Denny, Jr. et al. | 424/52 |
| 4,457,856 | 7/1984 | Mitchell et al. | 252/166 |
| 4,599,186 | 7/1986 | Choy et al. | 252/DIG. 14 |
| 4,614,612 | 9/1986 | Reilly et al. | 252/541 |
| 4,657,692 | 4/1987 | Choy et al. | 252/DIG. 14 |
| 4,681,704 | 7/1987 | Bernardino et al. | 252/546 |
| 4,695,394 | 9/1987 | Choy et al. | 252/174.25 |
| 4,842,757 | 6/1989 | Rebos et al. | 252/76 |
| 5,135,675 | 8/1992 | Elliott et al. | 252/103 |
| 5,279,755 | 1/1994 | Choy et al. | 252/174.25 |
| 5,346,641 | 9/1994 | Argo et al. | 252/174.25 |

*Primary Examiner*—Deborah Jones
*Attorney, Agent, or Firm*—R. Reams Goodloe, Jr.

[57] ABSTRACT

An abrasive paste composition. The abrasive paste is made up from an aqueous suspension of water insoluble abrasive particles of from about forty five percent (45%) to about sixty five percent (65%) by weight, from thickeners of natural or synthetic clay of from about three percent (3%) to about fifteen percent (15%) by weight, from liquid detergent of from about two percent (2%) to about twenty percent (20%) by weight, and from water of from about twenty percent (20%) to about sixty percent (60%) by weight, and optional ingredients such as dyes, humectant, and perfumes. The water based abrasive paste has abrasive particles sized to provide adequate cut without surface gouging for use in automotive painting and body repair.

16 Claims, No Drawings

ABRASIVE SANDING PASTE

FIELD OF THE INVENTION

The present invention relates to abrasive compositions, and more particularly to novel abrasive compositions for use in surface preparation prior to the application of new paint on selected portions of automobiles.

BACKGROUND

In the automotive paint and body industry, it would useful and desirable, when sanding cured, previously painted surfaces, to produce a uniform fine scratch in preparation for the application of new paint. It would also be useful and desirable during the sanding process to remove dirt, oil, grease, and road grime from such previously painted surfaces.

In order to provide background information so that the present invention may be completely understood and appreciated in its proper context, reference is made to several prior art approaches to solving the above identified objectives, as discussed below.

First, Ting™, a nonpatented product, relies on surfactants to clean a surface to be painted; however, it does not contain abrasives to scratch the painted surface in order provide for a mechanical bond. Therefore, when using Ting™, a 3M Brand Scotchbright™ steel wool or similar product must be used to achieve the desired scratch, in order to achieve proper mechanical bond. Unfortunately, some undetermined ingredient or ingredients in Ting™ leave a residue that must be further wiped off before paint can be applied to a Ting™ treated surface, and Ting™ is thus undesirable for this process.

Next, Sandfix™ is also a nonpatented product that contains abrasive particles to provide a scratch for mechanical bonding of the new paint to the old paint. However, whether due to the possible inappropriate ratio of abrasives to the suspension media, or due to the inability of the abrasive used in that product to properly cut existing paint, excess labor and product is required to prepare the surface to be painted with a proper scratch in order to assure mechanical bonding of the new paint to the existing paint. Also, the colloidal thickeners used in Sandfix™ appear to be excessive, which results in difficult removal of Sandfix™ during the rinse process. Further, the industry has recognized that Sandfix™ hardens and becomes very difficult to remove, if not completely removed while wet. Also, the dye used in Sandfix™ has a tendency to leach from beneath moldings and other parts after rinsing, and then to dry on the surface to be refinished. The dye, if not removed before painting, may necessitate repainting. Further, the absence of surfactants or detergents in this product result in it failing to fulfill the needs of the automotive paint and body industry.

U.S. Pat. No. 3,966,432 relates to abrasive compositions in liquid form for cleaning hard surfaces. The patent indicates, at line fifteen (15), column one (1), that "the compositions are not intended for use on softer surfaces such as ordinary paint work, except possible rubbing down prior to painting." However, the abrasive particle size provided in that formula is undesirable for use in the automotive painting industry, as at line twenty five (25), column one (1), it also states that "a typical particle size giving a satisfactory abrasive performance is such that substantially the whole of the particle material when dry, passes through a sieve with an aperture of one hundred four (104) microns and at least eighty percent (80%) by weight passes through a sieve with aperture of fifty three (53) microns." The one hundred four (104) micron square aperture which has a one hundred forty seven (147) micron diagonal aperture, can possibly allow a particle of one hundred forty (140) or more microns to pass therethrough, resulting in an abrasive particle capable of producing scratches too large to "cover" with automotive basecoat paint, due to the very low mil thickness buildup of such paints. Also, the same patent, at column three (3), line nine (9) states that it "has been found desirable to include the suspending agent in a range of zero point two five percent (0.25%) to one percent (1%)—preferably the minimum amount found to be necessary in any particular formulation to maintain the abrasive in suspension." Natural or synthetic clay suspension agents in that concentration range do not provide for a paste consistency of the desired viscosity, or provide for adequate suspension of the preferred pumice abrasive, in order to obtain the desired scratch for use in the automotive paint and body industry.

Whatever the precise merits, features, and advantages of the above cited references, none of them achieves or fulfills the purpose of providing the automotive paint and body industry with a fast cutting, water soluble, biodegradable, environmentally safe sanding paste that cleans as it sands, as does the present invention paste composition.

OBJECTS OF THE INVENTION

It is an object of the present invention to "cut" or sand quicker than possible with the existing arts, while maintaining a fine enough scratch to apply automotive basecoat paints, which have very little mil thickness buildup, and which do not "cover" coarser scratches, while providing enough scratch for a sufficient mechanical bond with the new paint, be it basecoats, clearcoats, or a single stage paint system.

It is a further object of the inventive paste composition to clean as it "sands" or "cuts."

Another object of the invention is to provide an easier rinse off with water than with the presently known arts. This is accomplished by using water rinseable suspending agents and by using water soluble detergents to also serve as a suspension media.

Still another object of the invention is to provide an environmentally safe, biodegradable product.

Still yet another object of the invention is to provide a product that is used in an aqueous state, thus eliminating nuisance dust which the U.S. Environmental Protection Agency ("EPA") has determined to be hazardous to personnel.

SUMMARY

The foregoing objects of the present invention are accomplished in an abrasive paste composition containing by weight:
(a) from about 45% to about 65% of a fine abrasive;
(b) from 3% to about 15% clay, synthetic or natural;
(c) from 2% to about 20% detergent;
(d) from 20% to about 60% water; and
(e) from 0.00% to about 10% dyes, perfumes, suds stabilizers, and miscellaneous ingredients and mixtures thereof.

DETAILED DESCRIPTION

The preferred paste composition contains four essential components, and additional optional ingredients, as follows:
a. the abrasive;
b. suspending agent;

c. detergent;
d. water;
e. additional optional ingredients;

The paste composition just set forth results in the provision of an abrasive paste which is especially effective for sanding (or "cutting") and cleaning of cured paints which are used in the automotive industry. The result of use of such an abrasive on a surface to be painted is a surface which (a) is clean, and (b) has sufficient scratch or "cut" to provide for proper mechanical bond of the new paint being applied.

Ideally, the paste composition contains from about forty five percent (45%) to about sixty five percent (65%) by weight of a substantially water insoluble abrasive. A number of abrasives may be used, including, but not limited to, calcite or ground marble, silica, feldspar, pumice, kieselguhr, and labradorite. Pumice is the preferred abrasive, as it has a tendency to continually break and expose new sharp edges, thus enhancing the cutting ability of the abrasive, as well as extending the life of the abrasive particles while in use. Preferred paste compositions contain from about fifty percent (50%) to about fifty eight (58%) of the pumice. Such pumice typically has particles of which seventy six percent (76%) are smaller than forty five (45) microns, and ninety seven percent (97%) are smaller than seventy five (75) microns, with about three percent (3.0%) being between seventy five (75) microns and ninety (90) microns in size. This corresponds to one hundred percent (100%) passing through a one-hundred seventy (170) mesh size sieve, and ninety seven percent (97%) passing through a two hundred (200) mesh size sieve, and seventy six percent (76%) passing through a three hundred twenty five (325) mesh size sieve.

The paste composition can contain from about three percent (3.0%) to about fifteen percent (15%) by weight of a synthetic or natural clay suspending agent. More preferably the paste composition contains from about four percent (4.0%) to about eight percent (8.0%) of a natural clay suspending agent. For example, the formula $(Si_8Mg_{5.1}Li_{0.6}H_{7.6}O_{24})_{0.6}$—$Na^+_{0.6}$ represents the formula for a synthetic clay suspending agent, similar in constitution to the mineral Hectorite. Alternately, a finely ground sodium bentonite, of which seventy five percent (75%) passes through a three hundred twenty five (325) mesh sieve, available under the trade name of "Big Horn CH-35" from WYO-BEN, INC., is an example of a natural clay suspending agent, and has a typical chemical analysis as set forth in TABLE I. The preferred suspending agent is finely ground sodium bentonite natural clay.

TABLE I

Composition of Sodium Bentonite

| Constituent | Amount Present |
| --- | --- |
| $SiO_2$ | 60.34% |
| $Al_2O_3$ | 19.28% |
| $Fe_2O_3$ | 3.48% |
| $Na_4O$ | 2.34% |
| $TiO_2$ | 0.22% |
| $CaO$ | 0.38% |
| $MgO$ | 1.67% |
| $K_2O$ | 0.10% |
| $H_2O$ | 7.75% |
| Other | 4.44% |

In conjunction with the natural or synthetic clay, the surfactants in the detergent contribute to the suspension of abrasives in the paste. The composition of my paste contains from about two percent (2.0%) to about twenty (20%) by weight, and more preferably from about two percent (2.0%) to about ten percent (10%) by weight, of a liquid detergent. As an example, a suitable liquid detergent could contain an alkyl sulfate and alkyl ethoxylated sulfate, with a composition of about twenty percent (20%) to about forty percent (40%) of anionic surfactant. However, the liquid detergent may have from about twelve percent (12%) up to about sixty two percent (62%) of an anionic surfactant which has the general formula $RO(C_2H_4O)_x$—$SO_3M$ wherein R is an alkyl group containing from about ten (10) to sixteen (16) carbon atoms, and where M is selected from the group consisting of sodium, potassium, ammonium, monoethanol ammonium, diethanol ammonium, triethanol ammonium, calcium and magnesium cations, and mixtures thereof, and the ethoxylate is such that, on a molar basis the compounds wherein x is zero (0) are from about fifty four percent (54%) to about sixty percent (60%), and wherein x is one (1) are from about fifteen percent (15%) to about twenty percent (20%), and wherein x is two (2) are from about ten percent (10%) to about thirteen percent (13%), and wherein x is three (3) are from about six percent (6.0%) to about seven percent (7.0%) of the total, and there is sufficient magnesium to at least neutralize fifty percent (50%) of the anionic surfactant wherein x is zero (0). Also, from one point two five percent (1.25%) to about twenty five percent (25%) of a suds stabilizer, and from about zero (0.00%) to about twelve point five percent (12.5%) of a detergency builder selected from inorganic silicates, carbonates, and organic carboxylates, and mixtures thereof, are included in the liquid detergent.

The paste composition of the present invention may contain from about twenty percent (20%) to about fifty percent (50%) by weight of water, and more preferably from about thirty five percent (35%) to about forty five percent (45%) by weight of water.

The paste composition of this invention may also consist of from about zero percent (0.00%) to about ten percent (10%) by weight of additional optional ingredients. Such ingredients are used to provide performance and aesthetic characteristics. For example, a humectant to prevent drying out of the composition, sorbitol being an example, may be desirable. Also, perfumes, coloring agents or dyes, or other agents may be desirable.

The preferred manufacturing procedure according to the present invention consists of:

(a) thorough mixing of water, the suspending agent, and the optional ingredients;

(b) adding the desired abrasive, and adding the desired detergent;

(c) pulling a vacuum of up to fifteen (15) inches of mercury or higher, and thoroughly mix.

Mixing the paste in a vacuum alleviates the need for consequent deaeration.

EXAMPLES

The following examples illustrate the invention.

Examples 1–3

The present invention, having the following composition by weight, is formulated:

| Ingredient | Ex. 1 | Ex. 2 | Ex. 3 |
| --- | --- | --- | --- |
| Pumice | 50.0% | 55.0% | 51.7% |
| Bentonite | 5.0% | 10.0% | 5.2% |

-continued

| Ingredient | Ex. 1 | Ex. 2 | Ex. 3 |
|---|---|---|---|
| Detergent RO($C_2H_4O$)$_x$-$SO_3M$ | 2.0% | 10.0% | 3.8% |
| Water | 42.5% | 24.5% | 38.8% |
| Dye, perfume, etc. | 0.5% | 0.5% | 0.5% |

Example 3 has the best consistency and combination of sanding, cleaning, and suspension properties, and is the preferred blend of ingredients.

The foregoing description of the preferred embodiment of the invention has been presented for the purpose of illustration and description. It is not intended to be exhaustive or to limit the invention to the present precise form disclosed. Many modifications and variations are possible in light of the above teachings. It is intended that the scope of the invention be limited not by this detailed description, but rather by the claims appended hereto.

What is claimed is:

1. A water based abrasive paste composition consisting essentially of:
   (a) from about 45% to about 65% by weight of a substantially water insoluble abrasive, and wherein said abrasive has an effective particle size in the range of less than approximately 90 microns, so as to provide a fine scratch size during use;
   (b) from about 3.0% to about 15% by weight of a synthetic or natural clay suspending and thickening agent;
   (c) from about 2.0% to about 20% by weight of a liquid detergent; and
   (d) from about 20% to about 50% by weight water.

2. An abrasive paste comprising:
   (a) from about 50% to about 58% by weight of pumice which comprises particles of which approximately 76% are smaller than 45 microns and of which approximately 97% are smaller than 75 microns, and of which approximately 3.0% are between 75 microns and 90 microns in size;
   (b) from about 4.0% to about 8.0% by weight finely ground sodium bentonite, of which approximately 75% passes through a 45 micron sieve;
   (c) from about 2.0% to about 10% by weight of a liquid detergent, said liquid detergent comprising an alkyl sulfate and an alkyl ethoxylated sulfate, with a composition of about 20% to about 40% of an anionic surfactant which has the general formula RO($C_2H_4O$)$_x$—$SO_3M$ wherein R is an alkyl group containing from about 10 to 16 carbon atoms, M is selected from the group consisting of sodium, potassium, ammonium, monoethanol ammonium, diethanol ammonium, triethanol ammonium, calcium and magnesium cations and mixtures thereof, and the ethoxylate is such that, on a molar basis the compounds wherein x is zero (0) are from about 54% to about 60%, wherein x is one (1) are from about 15% to about 20%, wherein x is two (2) are from about 10% to about 13%, and wherein x is three (3) are from about 6.0% to about 7.0% of the total, and there is sufficient magnesium to at least neutralize 50% of the anionic surfactant wherein x is zero (0); from 1.25% to about 25% of a suds stabilizer; and from about 0.00% to about 12.5% of a detergency builder selected from inorganic silicates, carbonates, and organic carboxylates, and mixtures thereof;
   (d) from about 35% to about 45% by weight water;
   (e) from about 0.01% to about 4.50% by weight of ingredients selected from the group of dyes, perfumes, and humectants.

3. An abrasive paste composition for use in preparation of a substrate surface by sanding and cleaning, to provide a sanded substrate surface which is clean and which has sufficient scratch to provide for mechanical bond of the cleaned, sanded, substrate surface to new paint applied thereto, said composition comprising:
   (a) from about 50% to about 58% by weight of pumice which has particles of which approximately 76% are smaller than 45 microns and of which approximately 97% are smaller than 75 microns, and with approximately 3.0% being between 75 microns and 90 microns in size;
   (b) from about 4.0% to about 8.0% by weight finely ground sodium bentonite, of which about 75% passes through a 45 micron sieve, and having a typical chemical analysis of: $SiO_2$/60.34%, $Ai_2O_3$/19.28%, $Fe_2O_3$/3.48%, $Na_4O$/2.34%, $TiO_2$/0.22%, $CaO$/0.38%, $MgO$/1.67%, $K_2O$/0.10%, $H_2O$/7.75%, other 4.44%;
   (c) from about 2.0% to about 10% by weight of a liquid detergent, said liquid detergent comprising an alkyl sulfate and an alkyl ethoxylated sulfate, with a composition of
      (i) about 20% to about 40% of an anionic surfactant which has the general formula RO($C_2H_4O$)$_x$—$SO_3M$ wherein R is an alkyl group containing from about 10 to 16 carbon atoms, M is selected from the group consisting of sodium, potassium, ammonium, monoethanol ammonium, diethanol ammonium, triethanol ammonium, calcium and magnesium cations and mixtures thereof, and the ethoxylate is such that, on a molar basis the compounds wherein x is zero (0) are from about 54% to about 60%, wherein x is one (1) are from about 15% to about 20%, wherein x is two (2) are from about 10% to about 13%, and wherein x is three (3) are about from 6.0% to about 7.0% of the total, and there is sufficient magnesium to at least neutralize 50% of the anionic surfactant wherein x is zero (0);
      (ii) from 1.25% to about 25% of a suds stabilizer; and
      (iii) from about 0.00% to about 12.5% of a detergency builder selected from inorganic silicates, carbonates, and organic carboxylates, and mixtures thereof;
   (d) from about 35% to about 45% by weight water;
   (e) from about 0.05% to about 0.50% by weight dye.

4. The abrasive composition as set forth in claim 1, wherein said abrasive comprises pumice.

5. The abrasive composition as set forth in claim 4, wherein said pumice comprises particles of which approximately 76% are smaller than 45 microns and of which approximately 97% are smaller than 75 microns, and of which approximately 3.0 are between 75 microns and 90 microns in size.

6. The abrasive composition as set forth in claim 1, wherein said clay is finely ground bentonite.

7. The abrasive composition as set forth in claim 6, wherein said bentonite is sodium bentonite, of which about 75% passes through a 45 micron sieve, and having a typical chemical analysis of: $SiO_2$/60.34%, $TiO_2$/0.22%, $CaO$/0.38%, $MgO$/1/67%, $K_2O$/0.10%, $H_2O$/7.75%, other 4.44%.

8. The abrasive composition as set forth in claim 1, wherein said clay is Hectorite.

9. The abrasive composition as set forth in claim 1, wherein said liquid detergent is present from about 2.0% to about 10% by weight, and wherein said liquid detergent is selected from the group consisting of alkyl sulfate and alkyl ethoxylated sulfate.

10. The abrasive compound as set forth in claim 9, wherein said liquid detergent is comprised of
   (a) from about 20% to about 40% of an anionic surfactant which has the general formula $RO(C_2H_4O)_x$—$SO_3M$ wherein R is an alkyl group containing from about 10 to 16 carbon atoms, M is selected from the group consisting of sodium, potassium, ammonium, monoethanol ammonium, diethanol ammonium, triethanol ammonium, calcium and magnesium cations and mixtures thereof, and the ethoxylate is such that, on a molar basis the compounds wherein x is zero (0) are from about 54% to about 60%, and wherein x is one (1) are from about 15% to about 20%, and wherein x is two (2) are from about 10% to about 13%, and wherein x is three (3) are about from 6.0% to about 7.0% of the total, and there is sufficient magnesium to at least neutralize 50% of the anionic surfactant wherein x is zero (0);
   (b) from about 1.25% to about 25% of a suds stabilizer; and
   (c) from about 0.00% to about 12.5% of a detergency builder selected from inorganic silicates, carbonates, and organic carboxylates, and mixtures thereof.

11. The abrasive composition as set forth in claim 2, wherein said humectants comprise sorbitol.

12. The abrasive paste composition as set forth in claim 1, wherein said insoluble abrasive comprises calcite.

13. The abrasive paste composition as set forth in claim 1, wherein said insoluble abrasive comprises ground marble.

14. The abrasive paste composition as set forth in claim 1, wherein said abrasive comprises silica.

15. The abrasive paste composition as set forth in claim 1, wherein said insoluble abrasive comprises feldspar.

16. The abrasive paste composition as set forth in claim 1, wherein said insoluble abrasive comprises kieselguhr.

* * * * *